United States Patent
Murayama et al.

(10) Patent No.: US 7,367,194 B2
(45) Date of Patent: May 6, 2008

(54) PULSE DETONATION ENGINE SYSTEM FOR DRIVING TURBINE

(75) Inventors: Motohide Murayama, Tokyo (JP); Shigemichi Yamawaki, Tokyo (JP); Hidemi Toh, Tokyo (JP); Hideo Kobayashi, Tokyo (JP); Katsuyoshi Takahashi, Tokyo (JP); Kaoru Chiba, Tokyo (JP); Shigeharu Ohyagi, Saitama (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 457 days.

(21) Appl. No.: 10/511,906

(22) PCT Filed: Feb. 10, 2004

(86) PCT No.: PCT/JP2004/001426

§ 371 (c)(1),
(2), (4) Date: Oct. 20, 2004

(87) PCT Pub. No.: WO2004/072451

PCT Pub. Date: Aug. 26, 2004

(65) Prior Publication Data
US 2005/0210879 A1    Sep. 29, 2005

(30) Foreign Application Priority Data

| Feb. 12, 2003 | (JP) | ............................. 2003-033253 |
| Feb. 12, 2003 | (JP) | ............................. 2003-033301 |
| May 21, 2003 | (JP) | ............................. 2003-144087 |
| Dec. 22, 2003 | (JP) | ............................. 2003-424454 |

(51) Int. Cl.
*F02C 7/22* (2006.01)
*F02C 7/26* (2006.01)

(52) U.S. Cl. ..................... 60/776; 60/39.38

(58) Field of Classification Search .................. 60/247, 60/39.38, 39.76, 248
See application file for complete search history.

(56) References Cited

U.S. PATENT DOCUMENTS

| 2,629,225 | A | * | 2/1953 | Ammann | ...................... 60/248 |
| 3,877,219 | A | * | 4/1975 | Hagen | ....................... 60/39.38 |
| 4,175,380 | A | * | 11/1979 | Baycura | ...................... 60/776 |

(Continued)

FOREIGN PATENT DOCUMENTS

CH    233 945    8/1944

(Continued)

*Primary Examiner*—William H. Rodríguez
(74) *Attorney, Agent, or Firm*—Oblon, Spivak, McClelland, Maier & Neustadt, P.C.

(57) ABSTRACT

A pulse detonation engine system (1) for driving a turbine is comprises a detonation generator section (5) including a detonation tube (7) having a tubular hollow section for permitting detonation to be generated therein during combustion stage of a mixture gas combined with a gas and a fuel, a gas supply section (17) for feeding the gas into the tubular hollow section of the detonation tube (7) at given time intervals, a fuel valve (19) for feeding the fuel into the tubular hollow section of the detonation tube (7) at the given time intervals, and an ignition plug (15) for igniting the mixture gas in the tubular hollow section of the detonation tube (7), and a pulse detonation driven turbine (9) driven directly or indirectly by energy of detonations that are intermittently generated in the tubular hollow section of the detonation tube (7).

23 Claims, 12 Drawing Sheets

U.S. PATENT DOCUMENTS

| | | | |
|---|---|---|---|
| 5,513,489 A | 5/1996 | Bussing | |
| 6,062,018 A | 5/2000 | Bussing | |
| 6,167,693 B1 | 1/2001 | Anderson | |
| 6,584,761 B2* | 7/2003 | Hunter, Jr. | 60/204 |
| 6,666,018 B2* | 12/2003 | Butler et al. | 60/226.1 |
| 6,886,325 B2* | 5/2005 | Norris et al. | 60/39.34 |
| 7,007,455 B2* | 3/2006 | Kraft | 60/247 |
| 7,047,724 B2* | 5/2006 | Nordeen et al. | 60/226.1 |
| 7,093,446 B2* | 8/2006 | Orlando et al. | 60/782 |
| 7,100,360 B2* | 9/2006 | Sammann et al. | 60/226.1 |
| 7,124,573 B2* | 10/2006 | Venkataramani et al. | 60/247 |
| 7,131,260 B2* | 11/2006 | Dean et al. | 60/39.76 |
| 7,150,143 B2* | 12/2006 | Schick et al. | 60/39.38 |
| 7,178,339 B2* | 2/2007 | Goldmeer et al. | 60/775 |
| 2004/0154306 A1* | 8/2004 | Benians | 60/776 |
| 2005/0109010 A1* | 5/2005 | Dean et al. | 60/39.76 |
| 2005/0279078 A1* | 12/2005 | Dean et al. | 60/39.76 |
| 2006/0260291 A1* | 11/2006 | Vandervort et al. | 60/39.76 |

FOREIGN PATENT DOCUMENTS

| | | |
|---|---|---|
| GB | 1 048 448 | 11/1966 |
| JP | 2001-355515 | 12/2001 |

* cited by examiner

FIG. 1A
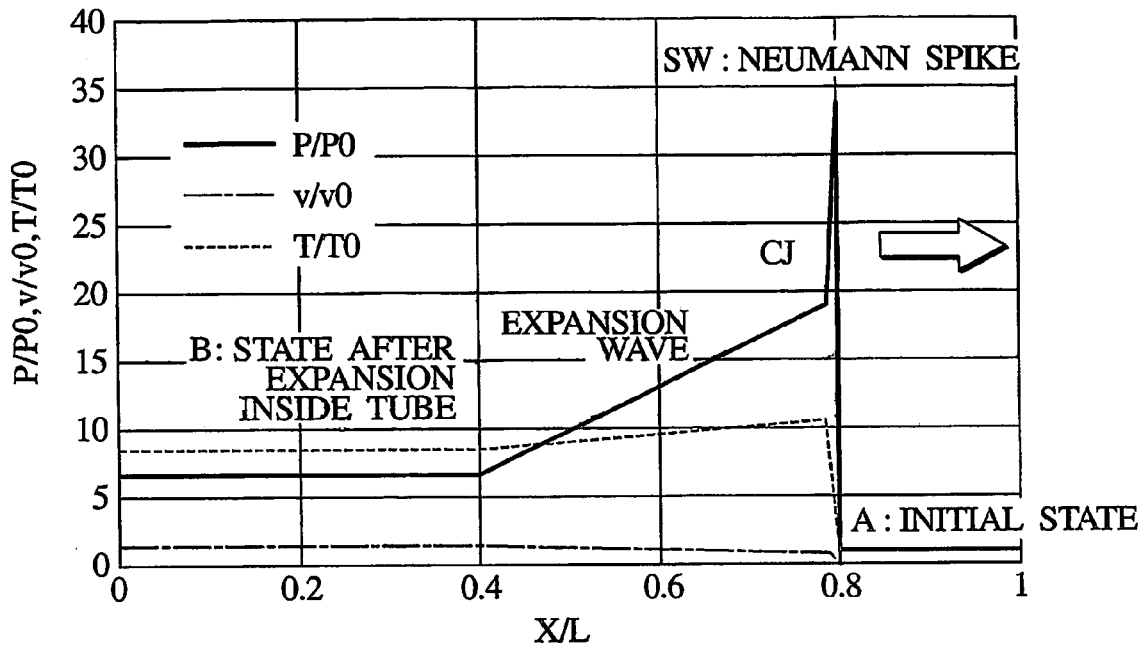
FIG. 1B
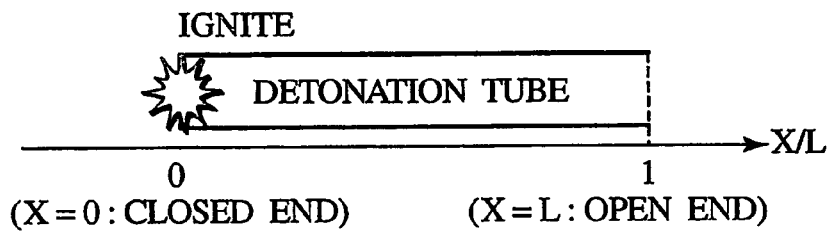
FIG. 1C
| LOCATION | A<br>INITIAL STATE | SW<br>AFTER SHOCK WAVE | CJ<br>CJ STATE | B<br>AFTER EXPANSION INSIDE TUBE | C<br>AFTER EXPANSION OUTSIDE TUBE |
|---|---|---|---|---|---|
| P/P0 | 1 | 33.9 | 19.1 | 6.7 | 1 |
| v/v0 | 1 | 0.20 | 0.55 | 1.27 | 5.69 |
| T/T0 | 1 | 6.6 | 10.5 | 8.5 | 5.7 |
| T[K] | 298 | 1971 | 3130 | 2523 | 1696 |

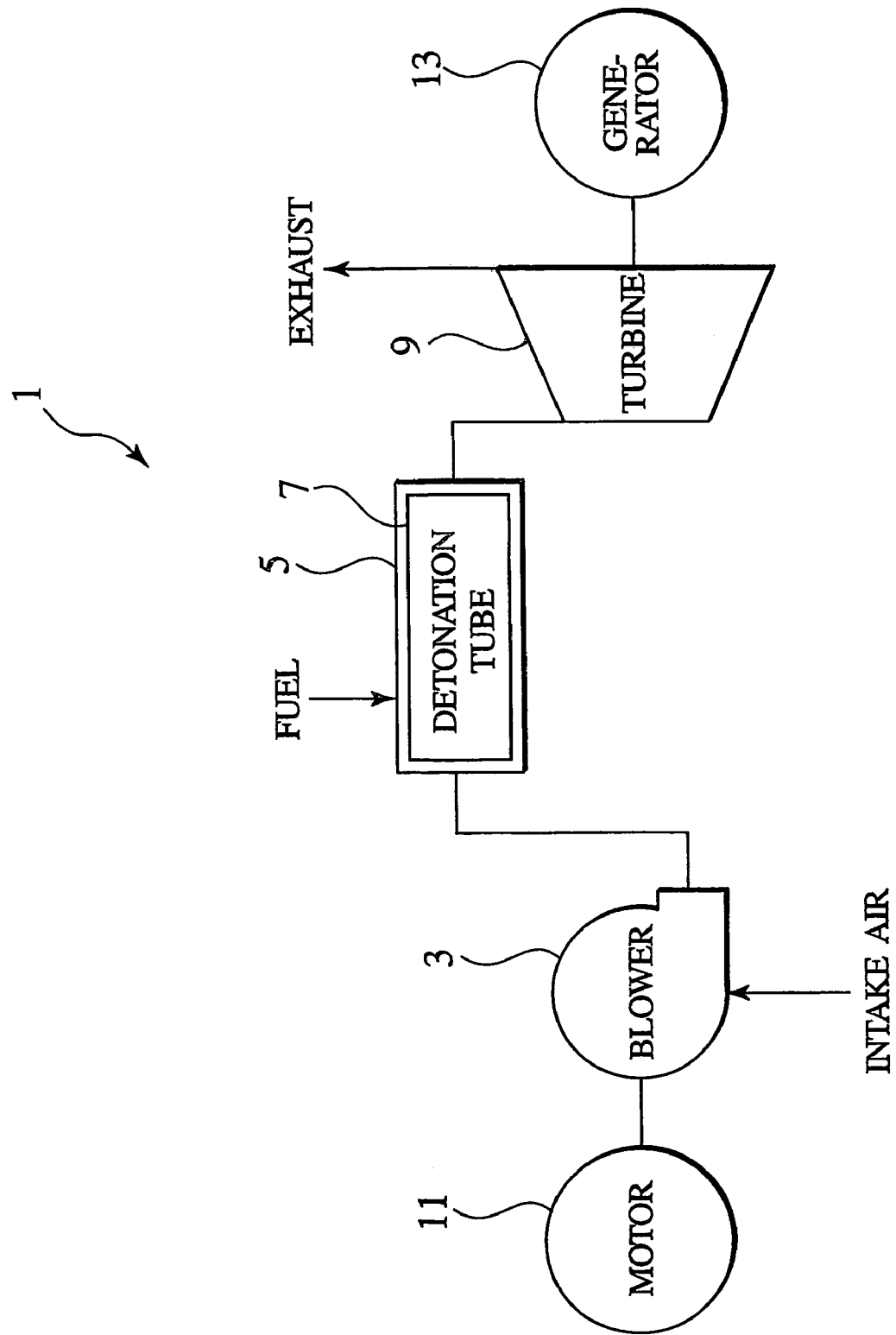

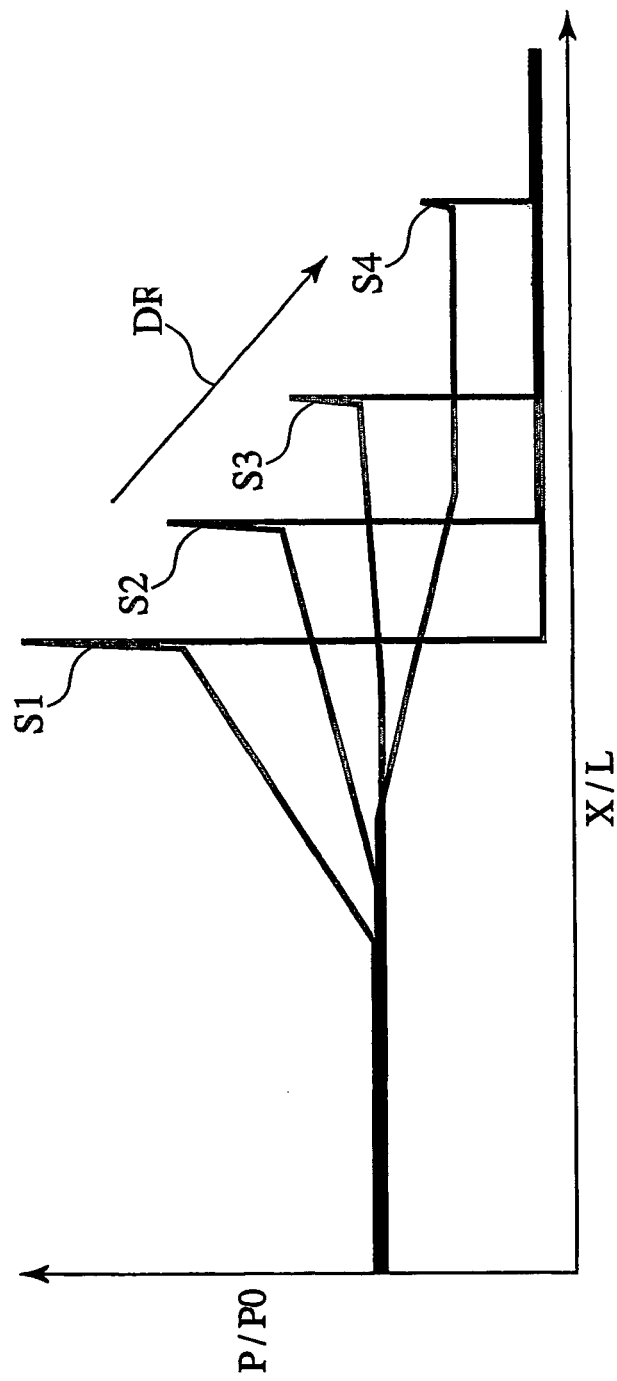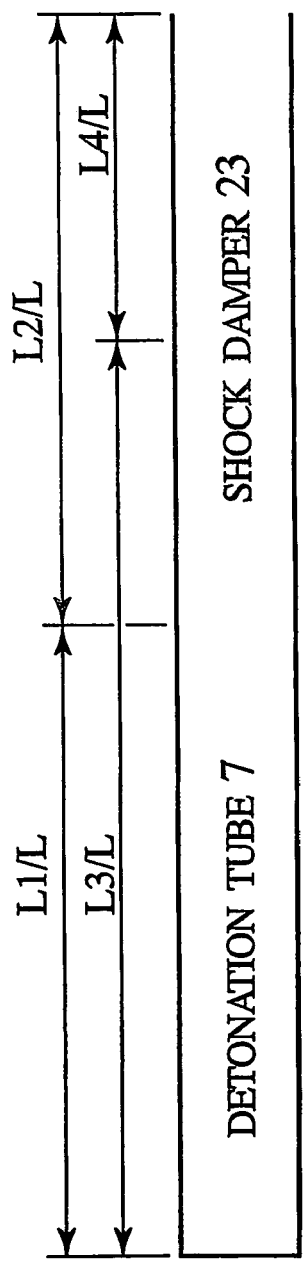
FIG. 6A
FIG. 6B

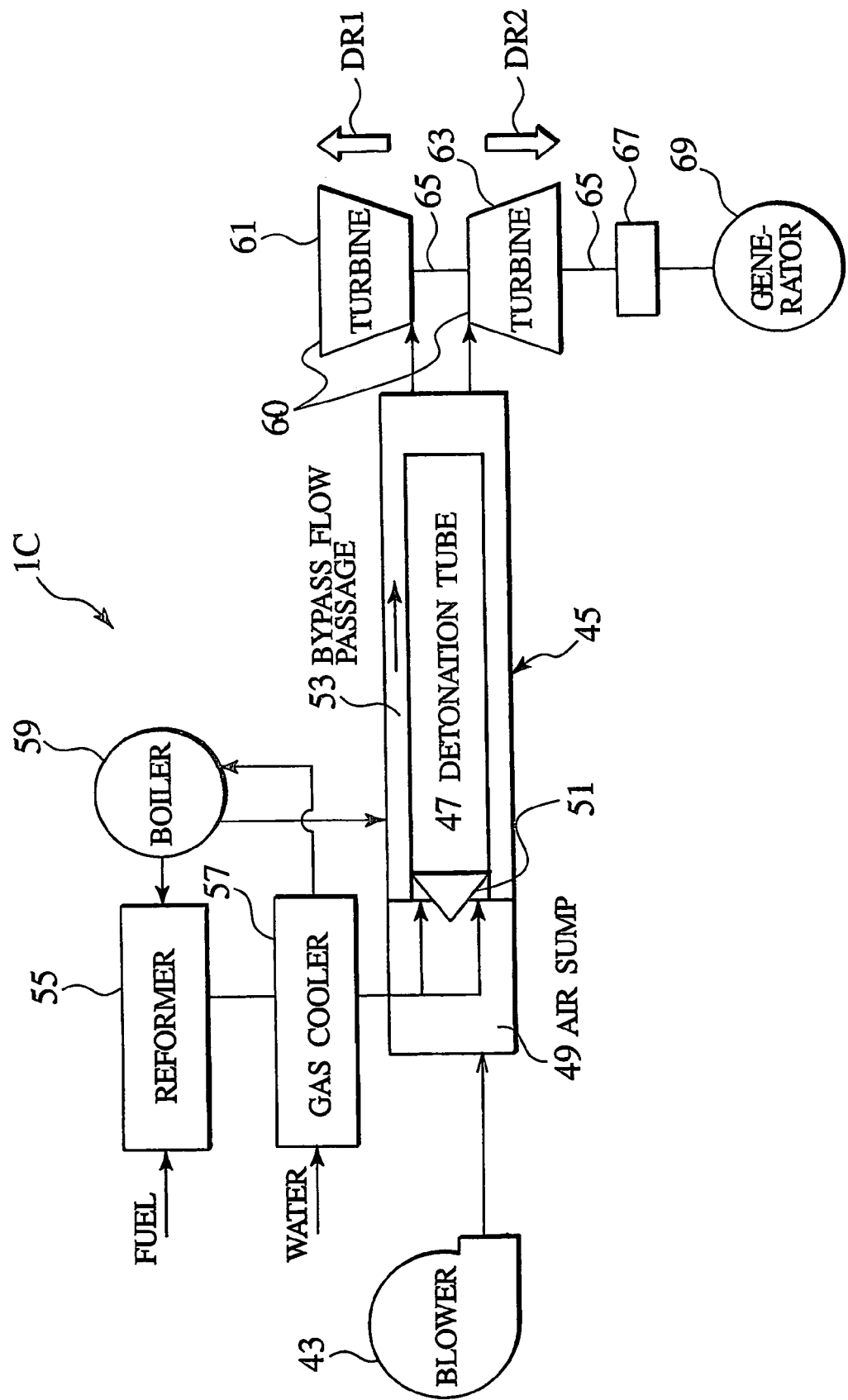

PULSE DETONATION ENGINE SYSTEM FOR DRIVING TURBINE

TECHNICAL FIELD

The present invention relates to pulse detonation engine systems for driving turbines and turbine driving methods using the same, and more particularly, to a pulse detonation engine system for driving a turbine, that utilizes impact energies of detonation waves intermittently produced as motive power used for electric power generation, and a turbine driving method using the same.

BACKGROUND ART

A pulse detonation engine (PDE) is a type of aircraft engine that utilizes impact energy of a detonation wave with a pulsed form, which is produced in a combustion process of a heat cycle, as motive power.

FIG. 1B is a schematic view illustrating an operating principle of a pulse detonation engine. When a mixture gas, which is combined with a fuel and a gas (oxidant such as air), is ignited in a closed end (at a left side in the figure) of a detonation tube, a deflagration is produced. A deflagration changes into a detonation by using a turbulence generator. That is, a combustion state of a mixture gas transits from a deflagration to a detonation under proper conditions. A detonation is defined as a rapid explosion that generates a supersonic pressure wave (shock wave), so called detonation wave, in the detonation tube. Then, extremely higher impact energy of a detonation wave is released from an open end (at a right side in the figure) to the outside of the detonation tube.

FIG. 1A is a schematic view illustrating some physical quantities (pressure P/P0, volume v/v0 and temperature T/T0) of the inside of the detonation tube at a certain time after transition, of a combustion state of a mixture gas, from a deflagration to a detonation. FIG. 1C is a table numerically illustrating pressure P/P0, volume v/v0, and temperature T/T0, at various points of the detonation tube.

In FIGS. 1A to 1C, a location of each point in the detonation tube is expressed as a dimensionless quantity X/L, which is a ratio of a length X from the closed end of the detonation tube to a total length L of the detonation tube; a pressure at each point in the detonation tube a dimensionless quantity $P/P_o$, which is a ratio of a pressure P at each point to a pressure $P_o$ of the initial state in the detonation tube; a volume of a detonation wave at each point in the detonation tube a dimensionless quantity $v/v_o$, which is a ratio of a volume v at each point to a volume $v_o$ of the initial state in the detonation tube; and a temperature of each point in the detonation tube a dimensionless quantity $T/T_o$, which is a ratio of temperature T at each point to a temperature $T_0$ of the initial state in the detonation tube.

In these assumptions, in the vicinity of 0.8 (location: SW) of the detonation tube, pressure of a detonation wave in the detonation tube sharply rises (this phenomenon is called as Neumann spike). In a range between the vicinity of 0.8 and the vicinity of 1 (location: A (the open end)), pressure in the detonation tube remains in an initial state of an ignition process. Also, in a range between the vicinity of 0 (location: the closed end) and the vicinity of 0.4 (location: B in a state subsequent to expansion in the detonation tube), pressure in the detonation tube remains constant. Moreover, in a range between the vicinity of 0.4 and the vicinity of 0.8, pressure of an expansion wave in the detonation tube monotonously increases. Thus, FIG. 1C shows that a detonation instantaneously generates a detonation wave with a pulsed form having extremely higher pressure and temperature.

In such a manner, a detonation wave, which is propagated in the detonation tube at a supersonic speed, with an extremely higher pressure and temperature than those of normal deflagration, is released to the outside of the detonation tube. A heat cycle of combustion in the form of a detonation is not a Brayton cycle (that is, constant pressure process in which combustion is produced with substantially constant pressure), but a Humphrey cycle (that is, constant volume process in which combustion is produced with substantially constant volume). A thermal efficiency of the pulse detonation engine obtained by using the Humphrey cycle is higher than that obtained by using the Brayton cycle in the normal jet engine. That is,-combustion in the form of a detonation provides a higher thermal efficiency than that of combustion in the form of a deflagration.

The pulse detonation engine available to obtain impact energies of detonation waves intermittently generated with the features described above has hidden potentialities which supersedes all propulsion engines such as a turbofan, a turbo jet, a ran jet and rocket (see Japanese Patent Application No. 2001-097814 (Japanese Patent Provisional Publication No. 2001-355515)).

DISCLOSURE OF THE INVENTION

However, such a pulse detonation engine is applicable to not only the propulsion engines described above but also wider area of technical fields such as electric power generators, automobiles, ships and machines and more. Thus, application for such a technical field itself is an important subject to be solved.

At the same time, it is an important subject to overcome various technical issues caused by application for such a technical field. For instance, when the pulse detonation engine is applied to a field of electric power generation, an exhaust gas having a temperature exceeding 2000° C. (see FIG. 1C), produced by the pulse detonation engine, causes an inlet temperature of a turbine to excessively rise. Also, if a turbine directly receives impact energies of detonation waves (shock waves) released to the outside of the detonation tube, the turbine may be damaged.

Further, since bearings (for instance, thrust bearings) for supporting a rotor shaft of the turbine are liable to bear large loads oriented in an axial direction, when the turbine is driven by the pulse detonation engine, seizure of the bearings may occur because motive gases intermittently flow from the pulse detonation engine into the turbine. Although one of approaches to solve this issue is designed in increased strengths, such an approach causes new issue of high cost.

Additionally, although a fuel appropriate for generating detonations is a secondary fuel (for instance, hydrogen, ethylene and acetylene or the like) that is processed from a primary fuel, a secondary fuel is expensive and requires much energy extra (for instance cost of a secondary fuel increases ten times that of a primary fuel per heat value) for processing. Also, since a primary fuel such a natural resource cannot be used for the pulse detonation engine system because it is hard to generate a detonation, a specific procedure such as using a detonation of hydrogen fuel as an initiator is required to solve this issue.

The present invention has been made in order to solve the issues described above, and a first aspect of the present invention provides a pulse detonation engine system for driving a turbine, comprising a detonation generator section including a detonation tube having a tabular hollow section for permitting a detonation to be generated therein during combustion process of a mixture gas combined with a gas and a fuel, a gas supply section for feeding the gas into the tubular hollow section of the detonation tube at given time intervals, a fuel supply section for feeding the fuel into the tubular hollow section of the detonation tube at the given time intervals, and an igniter for igniting the mixture gas in the tubular hollow section of the detonation tube; and a pulse detonation driven turbine driven by impact energies of detonations that intermittently generated in the tubular hollow section of the detonation tube.

Further, a second aspect of the present invention provides a method of driving a turbine using a pulse detonation engine system, comprising feeding a gas into a tabular hollow section of a detonation tube at given time intervals, feeding a fuel into the tubular hollow section of the detonation tube at the given time intervals, igniting a mixture gas combined with the gas and the fuel in the tubular hollow section of the detonation tube, permitting a detonation to be generated in the tubular hollow section of the detonation tube, and driving the turbine by introducing impact energies of detonations, intermittently generated in the tubular hollow section of the detonation tube, into the turbine.

BRIEF DESCRIPTION OF DRAWINGS

FIGS. 1A, 1B and 1C are schematic views illustrating an operating principle of a pulse detonation engine.

FIG. 2 is a schematic view illustrating a structure of a pulse detonation engine system for driving a turbine of a first embodiment of the present invention.

FIGS. 6A and 6B are illustrative views for illustrating how shocks are alleviated by the shock alleviating section of FIG. 5.

FIG. 7 is a schematic view illustrating a structure of a pulse detonation engine system for driving a turbine, wherein turbines are opposed to each other, of a fourth embodiment of the present invention.

BEST MODE FOR CARRYING OUT THE INVENTION

Preferred embodiments of the present invention are described below with reference to the accompanying drawings.

Figure 3:
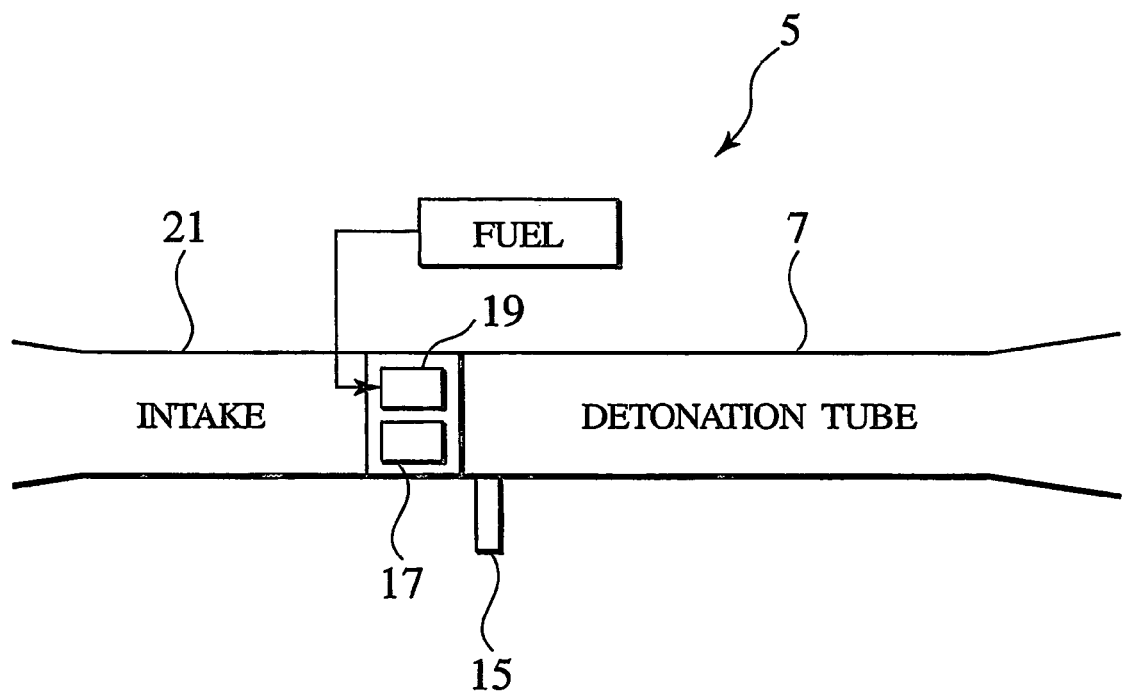
FIG. 3 is a schematic view illustrating a structure of a detonation generator section of FIG. 2.

FIG. 2 shows a schematic structure of a pulse detonation engine system for driving a turbine 1 of a first embodiment of the present invention. FIG. 3 shows a schematic structure of a detonation generator section 5 shown in FIG. 2.

The turbine drive pulse detonation engine system 1 of the present invention intermittently produces pulsed detonation waves with impact energies in combustion processes of heat cycles, and convert impact energies of detonation waves into motive power necessary for generating electric power.

The turbine drive pulse detonation engine system 1 includes a detonation generator section 5 that is comprised of a detonation tube 7 having a tubular hollow section formed in a given length to allow detonations to be produced therein, a gas supply section (for instance, an air valve) 17 for feeding a gas (for instance, oxidant such as air) into the tubular hollow section of the detonation tube 7, a fuel supply section (for instance, a fuel valve) 19 for feeding a fuel into the tubular hollow section of the detonation tube 7 at given time intervals, and an igniter (for instance, an ignition plug) 15 by which a mixture gas combined with the fuel and the air in the detonation tube 7 is ignited.

Here, air drawn from a blower 3, which is driven by a motor 11, is fed into the air supply section 17 through an intake 21. And, fresh air is filled in the tubular hollow section of the detonation tube 7, by purging combustion gases remaining in the detonation tube 7 after generation of a detonation. This enables fresh fuel to fill in the tubular hollow section of the detonation tube 7. Then, the igniter 15 ignites an appropriate amount of a mixture gas combined with the fresh air and the fresh fuel to produce next detonation. Repeated operations of this cycle enable detonations (detonation waves) to intermittently be produced. And, impact energies of detonations intermittently produced in the tubular hollow section of the detonation tube 7 are induced in a pulse detonation driven turbine 9. Then, the pulse detonation driven turbine 9 is consequently driven by the impact energies to rotate a generator (for instance, an electric power generator) 13 for generating electric power output.

Also, a detonation generates hot flow of a gas in the turbine drive pulse detonation engine system 1. After generation of hot flow, the gas supply section 17 feed air into the detonation tube 7 at an extra rate (that is, at a rate in excess of an appropriate flow rate) for each cycle to allows cold flow to generate. This cold flow permits a given area (for instance, the tubular hollow section of the detonation tube 7, and the pulse detonation driven turbine 9, etc.) to be intermittently cooled while combustion gases are purged out of the tubular hollow section of the detonation tube 7. Also, a stream of steam delivered from a boiler (heat recovery boiler) enable the pulse detonation driven turbine 9 to be cooled.

Time required for each process of the above operation is as follows: During 0.5 msec from start-up (ignition), a detonation is produced in the tubular hollow section of the detonation tube 7 (that is, a combustion state transits from a deflagration to a detonation). During next 1 msec, a detonation wave propagates in the detonation tube 7. During this time, as shown in FIG. 1C, pressure in the detonation tube 7 remains a constant value that is six to seven times of the initial pressure P0. During next 4 msec, a detonation wave is released to the outside of the detonation tube 7. Impact energy of the detonation wave enables the turbine drive pulse detonation engine system 1 to be driven. And, during next 6 msec, combustion gases in the detonation tube 7 is purged, and fresh air is refilled into the tubular hollow section of the detonation tube 7. Thus, in this case one cycle requires time for 10 msec, i.e., 100 Hz.

Figure 4:
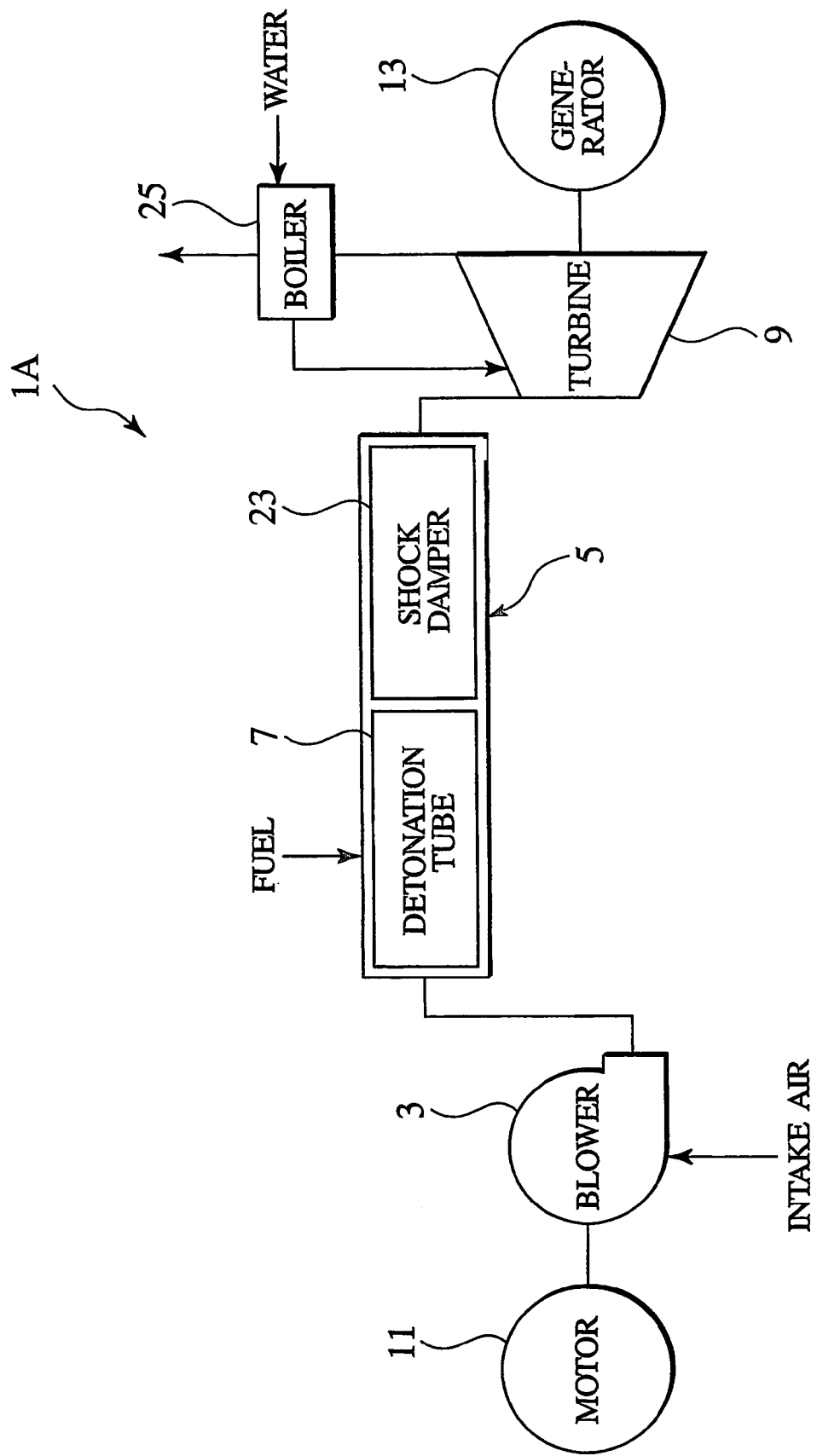
FIG. 4 is a view illustrating a structure of a pulse detonation engine system for driving a turbine, equipped with a shock alleviating section, of a second embodiment of the present invention.

FIG. 4 shows a schematic structure of a turbine drive pulse detonation engine system 1A, equipped with a shock alleviating section, of a second embodiment of the present invention. Here, the same component parts as those of the first embodiment bear the same reference numbers for describing differences from the first embodiment. In the turbine drive pulse detonation engine system 1A, the detonation generator section 5 includes the detonation tube 7, and a shock damper (shock alleviating section) 23 that converts impact energies of detonation waves released from an opening portion (open end portion) of the detonation tube 7, into compression energy of a gas (oxidant such as air) for alleviation of the impact energies. Then, compression energy of the converted gas is introduced into the pulse detonation driven turbine 9. Also, the turbine drive pulse detonation engine system 1A includes a boiler 25 that is supplied with water to generate steam by which the pulse detonation driven turbine 9 is cooled.

Figure 5:
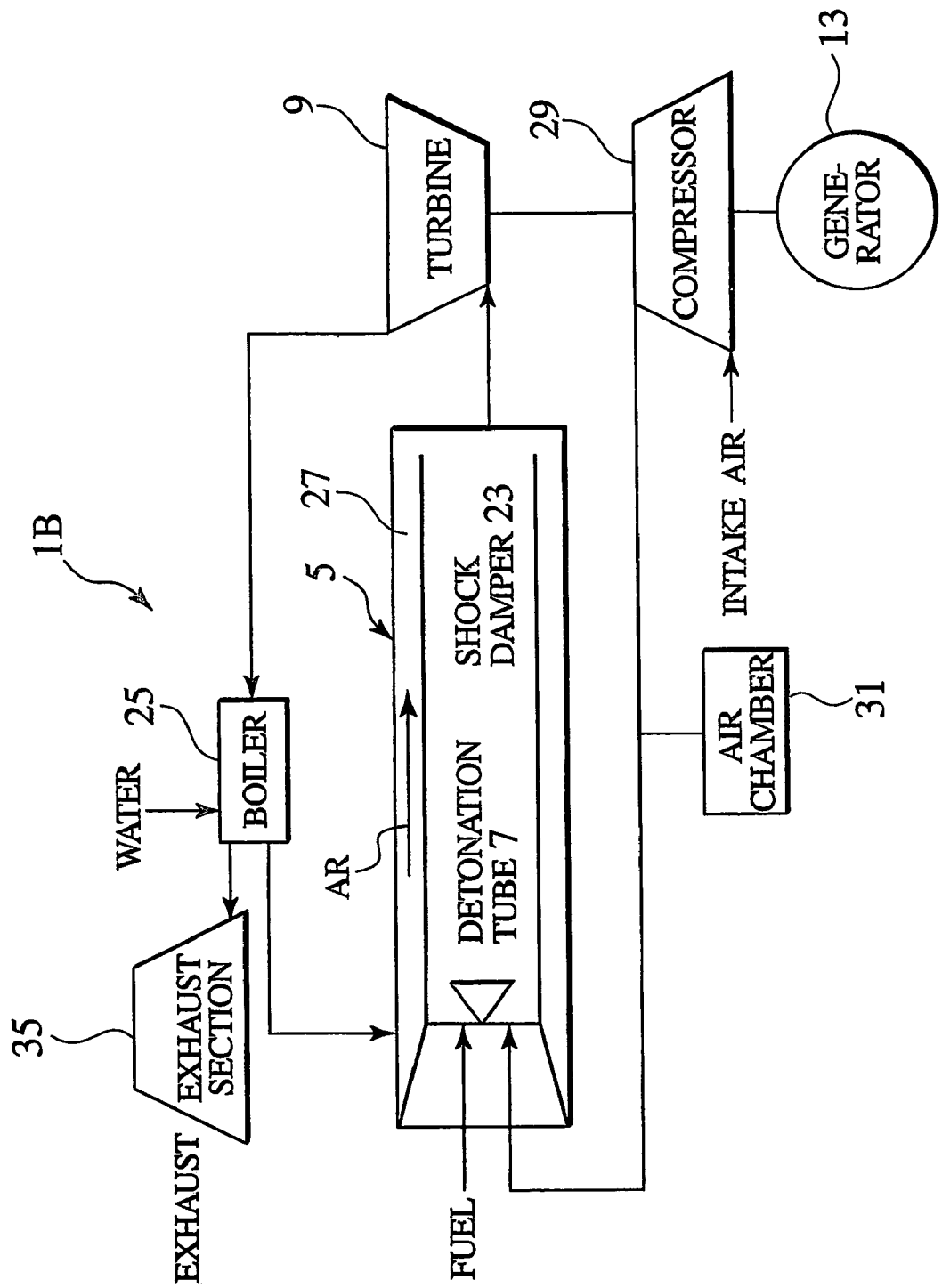
FIG. 5 is an illustrative view for illustrating a structure of a shock alleviating section of a third embodiment of the present invention.

FIG. 5 shows a concrete structure of a shock damper (shock alleviating section) 23 of a third embodiment of the present invention. Here, although an overall structure of a pulse detonation engine system 1B for driving a turbine is shown, the same component parts as those of the first embodiment bear the same reference numbers for description of differences from the first embodiment.

While the blower 3 supplies air in the turbine drive pulse detonation engine system 1 shown in FIG. 2, the present embodiment allows air to be fed to the tubular hollow section of the detonation tube 7 using a compressor 29. For protecting the compressor 29 from impact energies of shock waves (detonation waves) when detonations are produced, an air chamber 31 is disposed on the way of an air path. This prevents the compressor 29 from directly suffering impact energies of detonation waves. Also, in place of the air chamber 31, an alternative structure may include a plurality of detonation tubes 7 which are disposed in parallel to each other, and an air valve may be periodically shifted in a way to avoid the pulse detonation driven turbine 9 from directly receiving impact energies of detonation waves.

The shock damper 23 is arranged to convert impact energies of detonation waves into compression energies of air to alleviate impact energies of detonation waves such that impact energies of detonation waves released from the inside of the detonation tube 7 are not directly applied to the pulse detonation driven turbine 9. The shock damper 23 is formed to be contiguous with the detonation tube 7 (for instance, the detonation tube 7 is fabricated to be elongated in a longitudinal direction so as to allow a portion to serve as the shock damper 23). Then, since the shock damper 23 closes impact energies of detonation waves (i.e., associated waves formed of shock waves, expansion waves, and more) into the tubular hollow section of the detonation tube 7, pressure in the tubular hollow section of the detonation tube 7 increases and impact energies of detonation waves are alleviated. Here, compressed gas in the tubular hollow section of the detonation tube 7 stores energy. This energy is introduced into the pulse detonation driven turbine 9, thereby driving the pulse detonation driven turbine 9. In other word the turbine drive pulse detonation engine system 1B of the present embodiment converts impact energies of detonation waves into compression energies of air, thereby protecting the pulse detonation driven turbine 9 while driving the same.

Further, the shock damper 23 includes a bypass flow passage 27 that permits a gas to flow for continuously operating the pulse detonation driven turbine 9. The bypass flow passage 27 is contiguous with the tubular hollow section of the detonation tube 7, and formed around an outer periphery of the detonation tube 7.

Since, as described above, detonations are intermittently produced, compression energies of air accumulated in the shock damper 27 intermittently are introduced into the pulse detonation driven turbine 9, too. It is necessary for continuously driving the pulse detonation driven turbine 9 to introduce a stream of a gas through the bypass flow passage 27 in a direction indicated by an arrow AR. For this reason, as a method of supplying a stream of a gas into the bypass flow passage 27, a steam generated by the boiler 25 may be supplied.

FIGS. 6A and 6B show how impact energies of detonation waves are alleviated using the shock damper (shock alleviating section) shown in FIG. 5. A fuel is fed into the tubular hollow section of the detonation tube 7 in which air is filled. And, as the igniter 15 ignites the mixture gas combined with the fuel and the air in the tubular hollow section of the detonation tube 7, a combustion state of the mixture gas transits from a deflagration to a detonation. Then, as a detonation wave (shock wave) propagates from the closed end (at the left side in the figure) to a position in a distance L1/L, pressure in the detonation tube 7 sharply rises (as indicated at a state S1 in FIG. 6A). Here, the shock damper 23 gradually alleviates pressure S1 (that is, a spike state in FIG. 6A gradually decreases in pressures S2, S3, S4) as a detonation proceeds toward the open end (at the right side in the figure) as indicated by an arrow DR, because air filled in a range of a distance L2/L is compressed. In such case, when a shock wave of a detonation proceeds from the closed end of the detonation tube 7 to a position in a distance L3/L, pressure of a shock wave is reduced to an appropriate value. Then, air filled in the range between the closed end of the detonation tube 7 and the position in a distance L2/L is compressed to a range extended to a distance L4/L. Thus, even when releasing such alleviated energy into the pulse detonation driven turbine 9, the pulse detonation driven turbine 9 may be not damaged.

FIG. 7 shows a concrete structure of a turbine drive pulse detonation engine driven electric power generation system 1C of a fourth embodiment of the present invention.

The turbine drive pulse detonation engine driven electric power generation system 1C includes a detonator generator section 45 that is comprised of a detonation tube 47 having a tabular hollow section extending in a given length to allow detonation to be produced therein, a blower 43 for feeding a gas (for instance, oxidant such as air) into the tubular hollow section of the detonation tube 47 at given time intervals, a reformer (fuel supply section) 55 by which a fuel is fed into the tubular hollow section of detonation tube 47 at the given time intervals, and an igniter (not shown) that ignites a mixture combined with the reformed fuel and the air in the detonation tube 47. Also, air drawn from the blower 43 is fed into the detonation tube 47 through an air sump 49 and an air valve (gas supply section) 51. Moreover, the reformed fuel delivered from the reformer 55 is cooled by water supplied to a gas cooler 57. In addition, this water is circulated to a boiler 59 whereupon water is used on one hand for reforming a fuel and caused on the other hand to flow through a bypass flow passage 53 provided in the detonation generator 45. This allows a gap between detonations that are intermittently produced to be compensated with a stream of steam, thereby enabling a pulse detonation driven turbine 60 to be continuously driven.

The pulse detonation driven turbine 60 is comprised of turbines 61, 63 that are connected to a rotor shaft 65 in opposition to each other. When impact energy (for instance, air pressure) of a detonation produced in the tubular hollow section of the detonation tube 47 is introduced into the turbines 61, 63, forces oriented in axially opposing directions (in directions as shown by arrows DR1, DR2) of the turbines 61, 63 is canceled each other and the turbines 61, 63 rotationally drive an electric power generator 69 for generating electric power.

In other words, when impact energy of a detonation produced in the tubular hollow section of the detonation tube 47 is concurrently introduced into the turbines 61, 63, the turbine 61 is applied with load (thrust load) in the direction as shown by the arrow DR1, and the turbine 63 is applied with load (thrust load) in the opposing direction as shown by the arrow DR2. The turbines 61, 63 are integrally fixed on the rotor shaft 65.

For this reason, loads oriented in the directions DR1, DR2 are opposite to each other and cancelled each other via the rotor shaft 65. Thus, since loads applied to bearings (for instance, thrust bearings) are alleviated, the bearings are suffered from seizure.

Moreover, in the turbine drive pulse detonation engine driven electric power generation system 1C, the gas supply section (for instance, an air valve 51 in communication with an air sump 49) supplies a gas to the detonation tube 47 at a rate in excess of appropriate flow rate for each cycle after the generation of a detonation followed by hot flow. This may preferably allow cold flow to be created for causing combustion gases to be purged from the tubular hollow section of the detonation tube 47 while permitting given areas (for instance, the tubular hollow section of the detonation tube 47 and the turbines 61, 63) to be intermittently cooled. Also, the turbines 61, 63 may be cooled using a stream of steam delivered from the boiler 59.

Further, since the turbines 61, 63 have effects to divide impact energy of a detonation wave released from the detonation tube 47 into two force components, the turbines 61, 63 have functions to serve as shock alleviating sections for alleviating impact energy of a detonation wave. However, more preferably, the detonation generator section 45 may include a shock damper (shock alleviating section) by which impact energies of detonation waves formed in a shock wave and an expansion wave released from an open end of the detonation tube 47 are converted into compression energies of a gas (for instance, air) to be alleviated.

Figure 8:
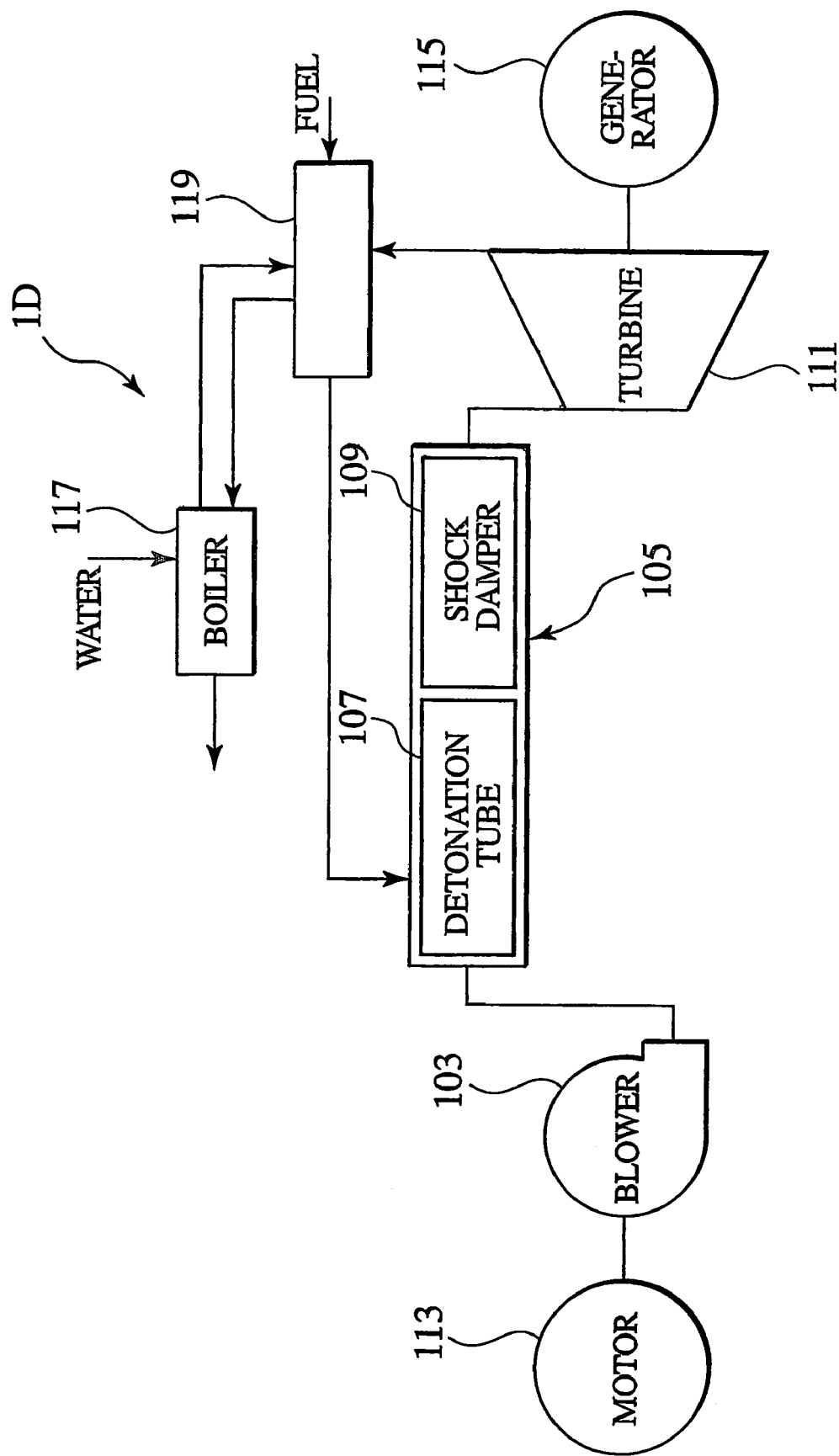
FIG. 8 is a schematic view illustrating a structure of a pulse detonation engine system for driving a turbine, equipped with a reformer, of a fifth embodiment of the present invention.
Figure 9:
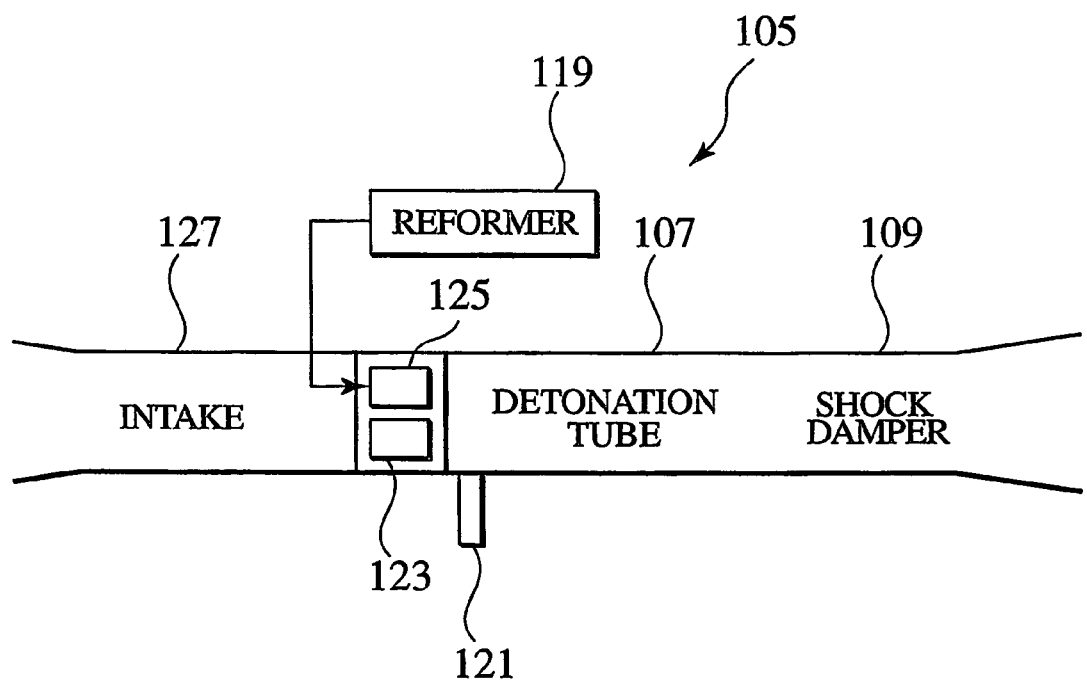
FIG. 9 is a schematic view illustrating a structure of a detonation generator section of FIG. 8.

FIGS. 8 and 9 show a turbine drive pulse detonation engine system 1D, equipped with a reformer, of a fifth embodiment of the present invention. FIG. 8 shows a schematic structure of the turbine drive pulse detonation engine system 1D. FIG. 9 shows a schematic structure of a detonation generator section 105 show in FIG. 8.

The turbine drive pulse detonation engine system 1D is comprised of a detonation generator section 105 that includes a detonation tube 107 having a tabular hollow section extending in a given length to allow detonation to be produced therein, a gas supply section (for instance, an air valve) 123 for feeding a gas (for instance, oxidant such as air) into the tubular hollow section of the detonation tube 107 at given time intervals, a reformer 119 for reforming a first fuel (for instance, primary fuel such as natural gas, methanol, LPG or the like) into a second fuel (for instance, hydrogen and carbon monoxide), a fuel supply section (for instance, a fuel valve) 125 for feeding a second fuel into the tubular hollow section of the detonation tube 107 at the given time intervals, and an igniter (for instance, an ignition plug) 121 for igniting fuel supplied into the detonation tube 47 and remaining therein. Also, the detonation tube 107 includes a shock damper (shock alleviating section) 109.

The reformer 119 is supplied with a first fuel such as hydrocarbon fuel, i.e., natural gas, LPG and petroleum, alcohol fuel or dimethyl ether. Additionally, the reformer 119 is supplied with steam generated by a boiler 117. This permits reformed gas in the reformer 119 to contain hydrogen at a rate of approximately 60% to serve as a second fuel appropriate for generation of a detonation. Also, in order to initiate a detonation, it is preferable for hydrogen contained in a second fuel to have a concentration ratio of greater than 30% because such a concentration ratio is necessary for causing a detonation to be produced.

Here, the supply of a gas into the gas supply section 125 is carried out through an intake 127 that admits the flow of air drawn from a blower 103 driven, for instance, by a motor 113. Also, purging combustion gases after generation of a detonation enables fresh air (for instance, oxidant) to be recharged. This enables a fuel to remain in the detonation tube 107. And, an appropriate amount of a fuel is ignited by the igniter 121, thereby causing fresh detonation to be initiated.

Impact energy generated in the tubular hollow section of the detonation tube 107 is converted to compression energy of air and alleviated by the shock damper 109 whereupon it is introduced into a pulse detonation turbine 111, which is consequently driven to rotate, for instance, a generator 115 to generate electric power. In the meanwhile, waste heat of the turbine 111 is introduced into the reformer 119 by which a first fuel is reformed into a second fuel. For instance, since heat released from the turbine 111 and introduced into the reformer 119 reaches a temperature of approximately 1000° C., a first fuel (hydrocarbon fuel, such as natural gas, LPG, petroleum, alcohol fuel or dimethyl ether, etc.) is appropriately reformed in the reformer 119.

In the turbine drive pulse detonation engine system 1D, the gas supply section 125 serves to feed a gas in excess (of an appropriate flow rate) to the detonation tube 107 for each cycle subsequent to the generation of detonation followed by hot flow. This allows cold flow to be created for permitting combustion gases to be purged from the tubular hollow section of the detonation tube 107 while given areas (for instance, the tubular hollow section of the detonation tube 107, and the turbine 111, etc.) are intermittently cooled. Also, a stream of steam delivered from the boiler 117 enables the turbine 111 to be cooled.

The above operations are executed for the same time intervals as those of the first embodiment.

Figure 10:
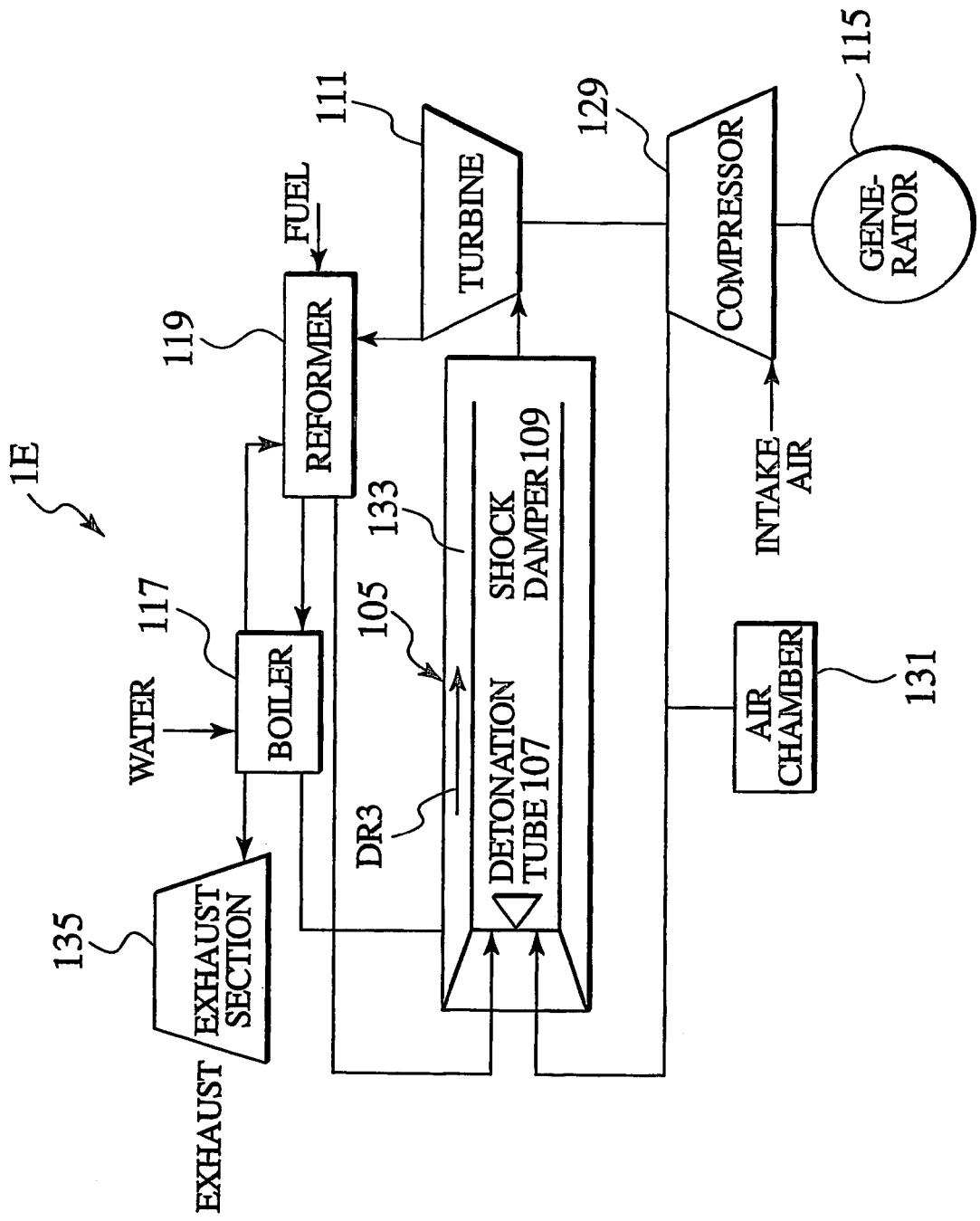
FIG. 10 is an illustrative view for illustrating a reformer and a shock alleviating section of a sixth embodiment of the present invention.

FIG. 10 shows a concrete structure of a shock damper 109 of a six embodiment of the present invention. Here, while an overall structure of a turbine drive pulse detonation engine system 1E is shown, the same component parts as those of the fifth embodiment bear the same reference numbers for description of differences from the fifth embodiment.

While the turbine drive pulse detonation engine system 1D sown in FIG. 8 is arranged to supply air using the blower, here, air is fed into the detonation tube 107 by means of a compressor 129. Therefore, for protecting the compressor 129 from suffering impact energies of shock waves (detonation waves) after a detonation is produced, for instance, an air chamber 131 is disposed on the way of an air path. This allows the compressor 129 to be avoided from being directly suffered from impact energies of detonation waves. Also, in place of the air chamber 131, alternative structure may include a plurality of detonation tubes 107, which are disposed in parallel to each other and an air valve is periodically shifted in the way to avoid the pulse detonation driven turbine 111 from being directly applied with impact energies of detonation waves.

The shock damper 109 is arranged to convert impact energies of detonation waves, into compression energies of air to alleviate impact energies of detonation waves such that impact energies of detonation waves released from the detonation tube 107 are not directly introduced into the pulse detonation driven turbine 111. The shock damper 109 is formed to be contiguous with the detonation tube 107 (for instance, the detonation tube 107 is fabricated to be elongated in a longitudinal direction so as to allow a portion to serve as the shock damper 109). Then, since the shock damper 109 closes impact energies of detonation waves (i.e., associated waves formed of shock waves, expansion waves and more) into the tubular hollow section of the detonation tube 107, pressure in the tubular hollow section of the detonation tube 107 increases and impact energies of detonation waves is alleviated. Here, compressed gas in the tubular hollow section of the detonation tube 107 stores energy. This energy is introduced into the pulse detonation driven turbine 111, thereby driving the pulse detonation driven turbine 111. In other words, the turbine drive pulse detonation engine system 1E converts impact energies of detonation waves into compression energies of air, thereby protecting the pulse detonation driven turbine 111 while driving the same.

Further, the shock damper 109 includes a bypass flow passage 133 for permitting a gas to flow for continuously operating the pulse detonation driven turbine 111. The bypass flow passage 133 is contiguous with the tubular hollow section of the detonation tube 107B, and formed around an outer peripheral side of the detonation tube 107.

Since, as described above, detonations are intermittently produced, compression energies of air accumulated in the shock damper 109 are introduced into the pulse detonation driven turbine 111, too. It is necessary for continuously driving the pulse detonation driven turbine 9 to introduce a stream of a gas through the bypass flow passage 133 in a direction as indicated by an arrow DR3. For this reason, as a method of feeding a stream of a gas into the bypass flow passage 133, a stream generated by the boiler 117 may be supplied.

In the meanwhile, with the present embodiment, waste heat of the turbine 111 is utilized to reform fuel. That is, a first fuel (for instance, hydrocarbon fuel such as natural gas, LPG, petroleum, alcohol fuel or dimethyl ether, etc.) is introduced into the reformer 119, to which steam generated in the boiler 117 is also introduced, thereby generating a second fuel (reformed gas) containing, for instance, hydrogen and carbon monoxide. This second fuel serves as fuel for detonation. Also, as described above, the stream of steam generated by the boiler 117 is fed into the bypass flow passage 133, and excess steam is discharged through an exhaust section 135.

Figure 11:
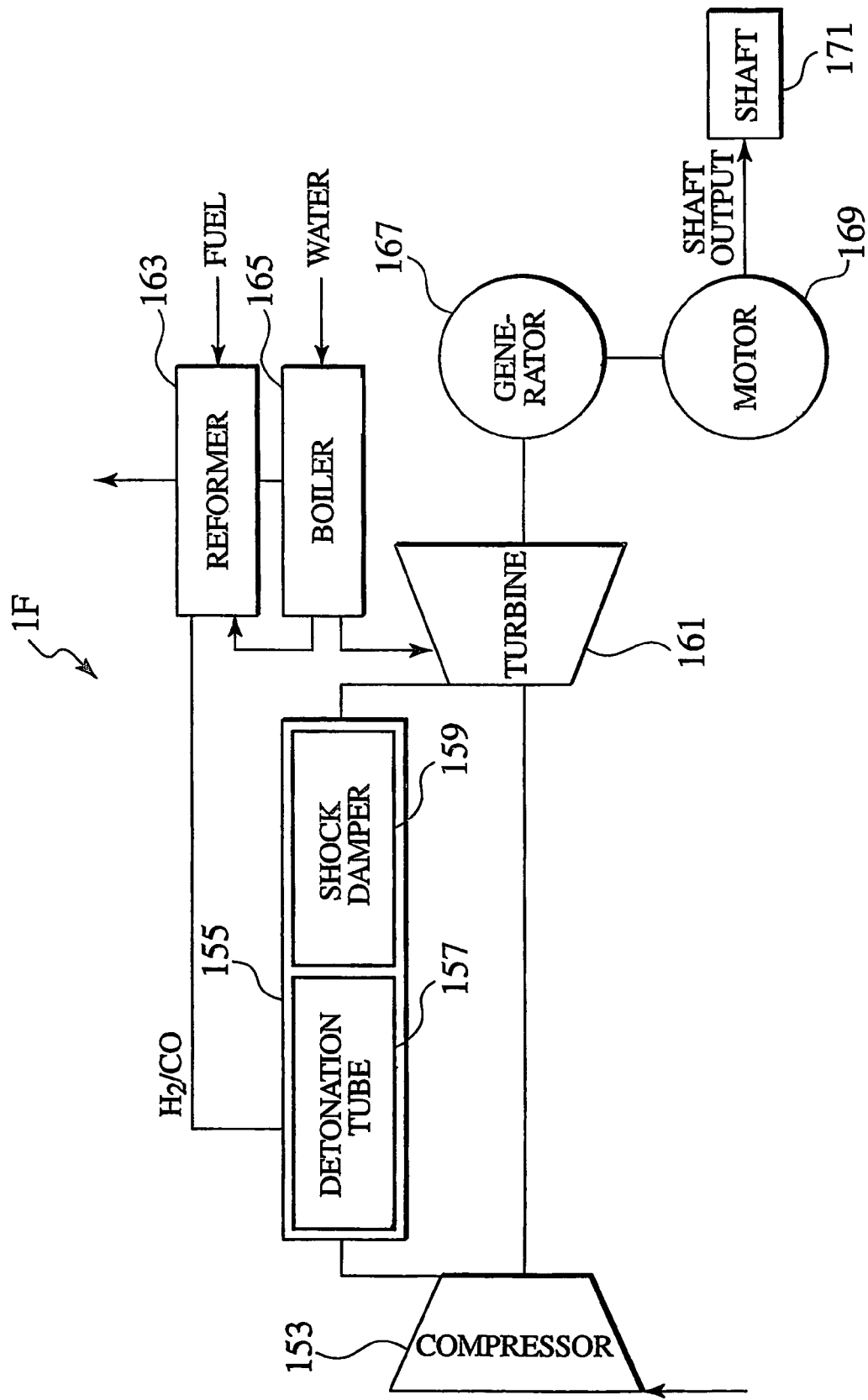
FIG. 11 is a schematic view illustrating a structure of a pulse detonation engine system for driving a turbine, which provides shaft output, of a seventh embodiment of the present invention.
Figure 12:
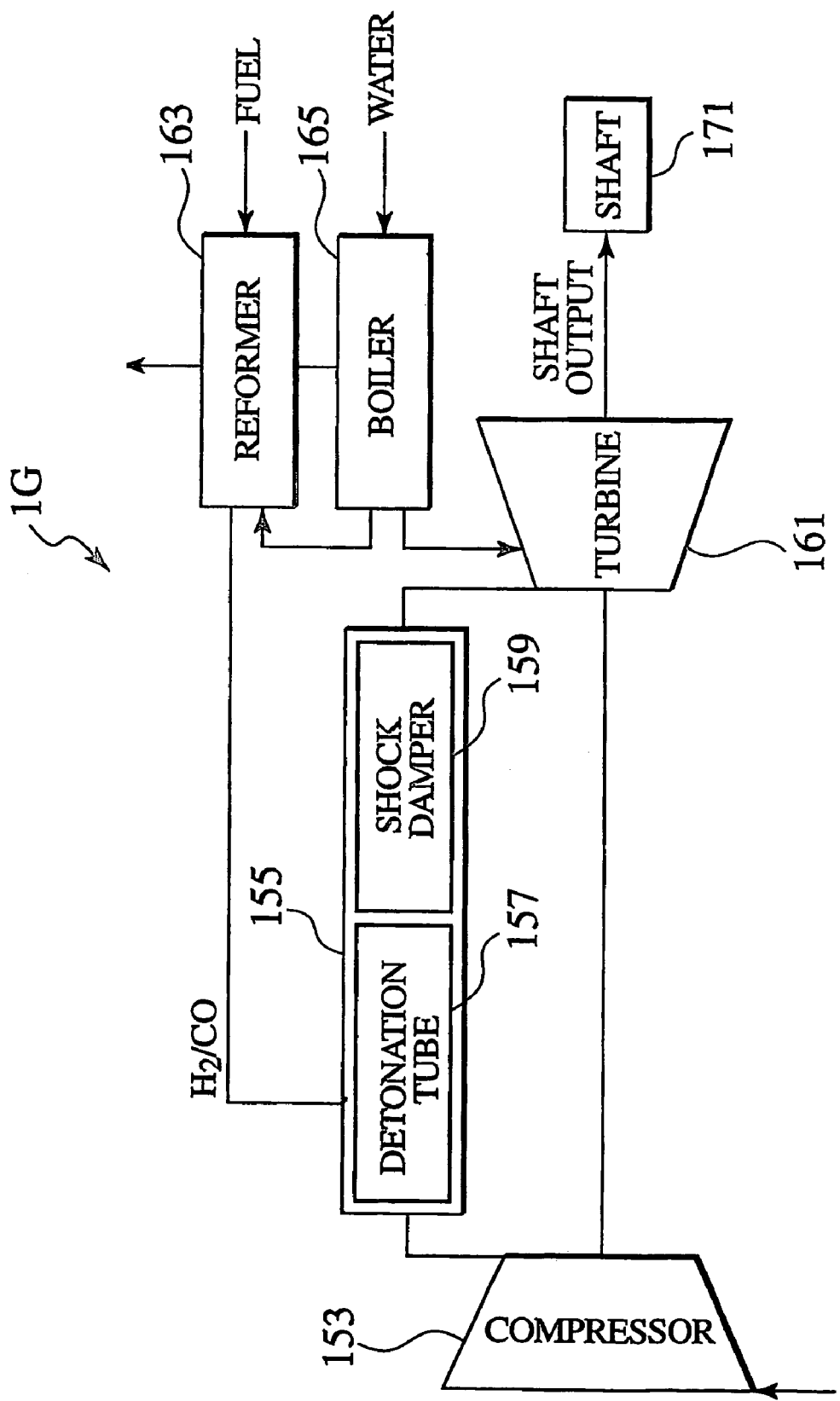
FIG. 12 is a schematic view illustrating a structure of a pulse detonation engine system for driving a turbine, which provides shaft output, of an eighth embodiment of the present invention.

FIG. 11 shows a system in which a motor is driven with electric power using a turbine drive pulse detonation engine system 1F of a seventh embodiment of the present invention. FIG. 12 shows a system in which turbine shaft output generated by a turbine drive pulse detonation engine system 1G of an eighth embodiment of the present invention is not used for electric power generation but for generating motive power.

As shown in FIG. 11, the turbine drive pulse detonation engine system 1F is comprised of a detonator generator section 155 that includes a detonation tube 157 having a tabular hollow section extending in a given length to allow detonation to be produced therein, and a shock damper (shock alleviating section) 159 for alleviating impact energies of detonation waves. Additionally, the turbine drive pulse detonation engine system 1F further includes a gas supply section (for instance, an air valve) 153 for feeding a gas (for instance, oxidant such as air) into the tubular hollow section of the detonation tube 157 at given time intervals, and a reformer 163 for reforming a first fuel (for instance, primary fuel such as natural gas, methanol, LPG or the like) into a second fuel (for instance, hydrogen and carbon monoxide) that is fed into the tubular hollow section of the detonation tube 157 at the given time intervals. Also, the turbine drive pulse detonation engine system 1F includes a boiler 165 by which supplied water is converted to steam, which is supplied to a pulse detonation driven turbine 161. This allows a mixture gas combined with the above-described second fuel and air in the tubular hollow section of the detonation tube 157, to be ignited for thereby generating a detonation.

And, in the turbine drive pulse detonation engine system 1F, the turbine 161 is rotationally driven to drive a generator 167 by which electric power is generated to drive a motor 169. And, obtaining shaft output of the motor 169 allows a power shaft 171 to be rotationally driven.

As shown in FIG. 12, the turbine drive pulse detonation engine system 1G is comprised of the detonation generator section 155 that includes the detonation tube 157 having the tabular hollow section extending in the given length to allow detonation to be produced therein, and the shock damper (shock alleviating section) 159 for alleviating impact energies of detonation waves. Additionally, the turbine drive pulse detonation engine system 1G further includes the gas supply section (for instance, an air compressor) 153 for feeding a gas (for instance, oxidant such as air) into the tubular hollow section of the detonation tube 157 at given time intervals, and the reformer 163 for reforming a first fuel (for instance, primary fuel such as natural gas, methanol, LPG or the like) into a second fuel (for instance, hydrogen and carbon monoxide) that is fed into the tubular hollow section of the detonation tube 157 at the given time intervals. Also, the turbine drive pulse detonation engine system 1G includes the boiler 165 by which supplied water is converted to steam, which is supplied to the turbine 161. This allows a mixture gas combined with the above-described second fuel and air in the tubular hollow section of the detonation tube 157, to be ignited for thereby generating a detonation.

And, the turbine drive pulse detonation engine system 1G rotationally drive the turbine 161 to provide a shaft output by which the power shaft 171 is rotationally driven.

The shaft output is delivered to and used for power shafts of, for instance, a vehicle (such as an automobile, a truck, a motorcycle, a construction machine or the like), a ship (involving a warship), a helicopter, a turboprop and a light airplane employing a piston engine. Also, in an electric power generation system in which shaft output is not used, shaft output may be utilized for a cogeneration system in domestic use to provide both electricity and heat.

In the meanwhile, as described above, the reformer 163 is supplied with a first fuel such as hydrocarbon fuel, for instance, natural gas, LPG and petroleum or the like, alcohol fuel or dimethyl ether, etc. Further, the reformer 163 is supplied with steam generated in the boiler 165. This allows reformed gas in the reformer 163 to contain hydrogen at a concentration rate of approximately 60%, forming a second fuel appropriate for generation of a detonation. Also, it is desirable for the ratio of hydrogen contained in a second fuel to exceed a value of 30% in order to cause a detonation to be produced because such a concentration is a necessary for generating a detonation.

In the turbine drive pulse detonation engine system 1G, the gas supply section 153 supplies the detonation tube 157 with a gas at a rate in excess (of an appropriate flow rate) for each cycle after generation of a detonation accompanied by hot flow. This allows cold flow to be created to compel combustion gases to be purged from the tubular hollow section of the detonation tube 157 while the given areas (for instance, the tubular hollow section of the detonation tube 157 and the turbine 161, etc.) are intermittently cooled. Also, the turbine 161 may be cooled with a stream of steam delivered from the boiler 165.

INDUSTRIAL APPLICABILITY

As is clear from the foregoing description, the present invention has advantageous effects as described below. (1) Using the turbine drive pulse detonation engine system for the purpose of generating electric power enables a high performance electric power generation system to be realized. (2) According to the turbine drive pulse detonation engine system of the present invention, cooling air intermittently supplies through the compressor enables various devices to be avoided from damages caused by high temperatures of detonations. (3) According to the turbine drive pulse detonation engine system of the present invention, impact energy to be applied to the turbine can be alleviated with the shock damper. (4) According to the turbine drive pulse detonation engine system of the present invention, reforming a primary fuel in the reformer into a secondary fuel appropriate for a detonation enables electric power to be generated at low cost. Also, since a thermal efficiency is improved by utilizing waste heat during step of reforming fuel, it is beneficial for generating electric power. (5) According to the turbine drive pulse detonation engine system of the present invention, the turbines are mounted on the common shaft in opposition to each other provides an effect that enables reduction in loads to be applied to the bearings (for instance, the thrust bearings) of the common shaft for thereby avoiding the seizure. (6) According to the turbine drive pulse detonation engine system of the present invention, since energy released from detonation can be directly obtained as shaft output, this shaft output can be utilized for driving the automobiles, ships and machines, etc.

Priority is claimed on Japanese Patent Applications NO. 2003-033253, filed Feb. 12, 2003, No. P2003-33301, filed Feb. 12, 2003, No. P2003-144087, filed May 21, 2003, and No. 2003-424454, filed Dec. 22, 2003, the content of which is incorporated by reference.

It is contemplated that numerous modifications may be made to the embodiments and implementations of the present invention without departing from the spirit and scope of the invention as defined in the following claims.

The invention claimed is:

1. A pulse detonation engine system, comprising:
a pulse detonation generator including a detonation tube having a tubular hollow section configured to generate a detonation wave therein during a combustion process of a mixture gas combined with a gas and a fuel, a gas supply section configured to feed the gas into the tubular hollow section of the detonation tube at a given time interval, a fuel supply section configured to feed the fuel into the tubular hollow section of the detonation tube at a given time interval, and an igniter configured to ignite the mixture gas in the tubular hollow section of the detonation tube;
a turbine driven by impact energies of detonation waves intermittently generated in the tubular hollow section of the detonation tube; and
a boiler configured to generate steam; wherein
the pulse detonation generator further includes a bypass flow passage configured to directly provide the steam generated by the boiler to the turbine in order to continuously operate the turbine.

2. The pulse detonation engine system according to claim 1, wherein
the pulse detonation generator further includes a shock alleviating section configured to alleviate the impact energies of the detonation waves in order to protect the turbine from directly receiving the impact energies of the detonation waves.

3. The pulse detonation engine system according to claim 2, wherein
the shock alleviating section includes a shock damper configured to convert the impact energies of the detonation waves, released from an open end of the detonation tube, into compression energy of the gas, and to introduce the compression energy of the gas into the turbine.

4. The pulse detonation engine system according to claim 1, wherein:
the turbine includes first and second turbines disposed on opposite ends of a common rotor shaft to allow the impact energies of the detonation waves to be dispersed onto the first and second turbines such that the first and second turbines are driven while permitting forces, applied thereto in an axial direction, to cancel each other.

5. The pulse detonation engine system according to claim 1, further comprising:
a reformer configured to reform a first fuel into a second fuel, wherein
the fuel to be supplied to the fuel supply section of the detonation tube includes the second fuel that is reformed.

6. The pulse detonation engine system according to claim 5, wherein
the first fuel includes a hydrocarbon fuel, an alcohol fuel, and dimethyl ether, and the reformer reforms the first fuel into the second fuel containing hydrogen and carbon monoxide.

7. The pulse detonation engine system according to claim 5, wherein
the second fuel that is reformed contains hydrogen at a ratio of 30% and more.

8. The pulse detonation engine system according to claim 5, wherein
the reformer introduces waste heat recovered from the turbine for achieving reforming.

9. The pulse detonation engine system according to claim 1, wherein
after a hot flow process, with a high temperature after generating a detonation wave, the gas supply section is operative to permit a cold flow process that combines purging a combustion gas from the detonation tube and cooling at least one of the tubular hollow section of the detonation tube and the turbine by supplying the tubular hollow section of the detonation tube with a gas in excess of a given flow rate, and is operative to alternately execute the hot flow process and the cold flow process.

10. The pulse detonation engine system according to claim 1, wherein:
the boiler is further configured to generate steam to pre-cool the turbine.

11. The pulse detonation engine system according to claim 1, further comprising:
an electric power generator configured to convert a drive force generated by the turbine into electric power.

12. The pulse detonation engine system according to claim 1, further comprising:
a shaft member rotated by motive power converted from drive force generated by the turbine.

13. A method of driving a turbine using a pulse detonation generator, the method comprising:
feeding a gas into a tubular hollow section of the pulse detonation generator at a given time interval;
feeding a fuel into the tubular hollow section of the pulse detonation generator at a given time interval;
igniting a mixture gas combined with the gas and the fuel in the tubular hollow section of the pulse detonation generator;
generating a detonation wave in the tubular hollow section of the pulse detonation generator; and
driving the turbine by impact energies of detonation waves, intermittently generated in the tubular hollow section of the pulse detonation generator; and
directly flowing a steam to the turbine through a bypass flow passage of the pulse detonation generator in order to continuously operate the turbine.

14. The method of driving the turbine according to claim 13, further comprising:
alleviating the impact energies of the detonation waves in order to protect the turbine from directly receiving the impact energies of the detonation waves.

15. The method of driving the turbine according to claim 14, wherein
the step of alleviating the impact energies comprises converting the impact energies of the detonation waves released from an open end portion of the pulse detonation generator into compression energy of the gas, and introducing the converted compression energy of the gas into the turbine.

16. The method of driving a turbine according to claim 13, wherein the turbine includes first and second turbines, and
the step of driving the turbine comprises dispersing the impact energies of the detonation waves into the first and second turbines, and driving the first and second turbines while permitting forces applied thereto in an axial direction to cancel each other.

17. The method of driving a turbine according to claim 13, wherein the turbine includes first and second turbines, and
the step of supplying the fuel comprises reforming a first fuel into a second fuel, and supplying the second fuel into the tubular hollow section of the pulse detonation generator at the given time interval.

18. The method of driving the turbine according to claim 17, wherein
the first fuel includes one of a hydrocarbon fuel, an alcohol fuel, and dimethyl ether, and the step of reforming the first fuel comprises reforming the first fuel into the second fuel containing hydrogen and carbon monoxide.

19. The method of driving the turbine according to claim 17, wherein
the step of reforming the first fuel performs reforming such that the resulting second fuel contains hydrogen at a ratio of 30% or more.

20. The method of driving the turbine according to claim 13, further comprising:
achieving a hot flow process with a high temperature after generating the detonation wave;
achieving a cold flow process by concurrently purging a combustion gas from the tubular hollow section of the pulse detonation generator and cooling at least one of the tubular hollow section of the pulse detonation generator and the turbine by supplying the tubular hollow section of the pulse detonation generator a gas in excess of a given flow rate; and
alternately executing the steps of achieving the hot flow process and the cold flow process.

21. The method of driving the turbine according to claim 13, further comprising:
pre-cooling the turbine with steam.

22. The method of driving the turbine according to claim 13, further comprising:
converting drive force generated by the turbine into electric power.

23. The method of driving the turbine according to claim 13, further comprising:
converting drive force generated by the turbine into motive power and transferring the motive power to a power shaft.

* * * * *